United States Patent
Tatsuno et al.

(10) Patent No.: US 10,727,497 B2
(45) Date of Patent: Jul. 28, 2020

(54) POROUS ELECTRODE SUBSTRATE, MEMBRANE-ELECTRODE ASSEMBLY USING SAME, AND POLYMER ELECTROLYTE FUEL CELL USING SAME

(71) Applicant: Mitsubishi Chemical Corporation, Chiyoda-ku (JP)

(72) Inventors: Hiroto Tatsuno, Tokyo (JP); Makoto Nakamura, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 437 days.

(21) Appl. No.: 15/522,414

(22) PCT Filed: Nov. 4, 2015

(86) PCT No.: PCT/JP2015/081019
§ 371 (c)(1),
(2) Date: Apr. 27, 2017

(87) PCT Pub. No.: WO2016/072414
PCT Pub. Date: May 12, 2016

(65) Prior Publication Data
US 2017/0338497 A1  Nov. 23, 2017

(30) Foreign Application Priority Data

Nov. 4, 2014  (JP) .................................. 2014-223950
Oct. 2, 2015  (JP) .................................. 2015-196501

(51) Int. Cl.
*H01M 4/92* (2006.01)
*H01M 4/86* (2006.01)
(Continued)

(52) U.S. Cl.
CPC ............... *H01M 4/926* (2013.01); *B32B 5/02* (2013.01); *H01M 4/8668* (2013.01);
(Continued)

(58) Field of Classification Search
CPC ............ B32B 5/02; H01M 2008/1095; H01M 4/8668; H01M 4/926; H01M 8/0234; H01M 8/0239; H01M 8/0245; H01M 8/1018
See application file for complete search history.

(56) References Cited

U.S. PATENT DOCUMENTS

2002/0058180 A1\* 5/2002 Beattie ................ H01M 8/0234
429/535
2002/0175073 A1  11/2002 Nakamura et al.
(Continued)

FOREIGN PATENT DOCUMENTS

CN  103329323 A  9/2013
EP  1 788 651 A1  5/2007
(Continued)

OTHER PUBLICATIONS

International Search Report dated Feb. 9, 2016 in PCT/JP2015/081019 filed Nov. 4, 2015.
(Continued)

*Primary Examiner* — Lingwen R Zeng
(74) *Attorney, Agent, or Firm* — Oblon, McClelland, Maier & Neustadt, L.L.P.

(57) ABSTRACT

Disclosed herein is a porous electrode substrate in which carbon fibers are dispersed in the structure thereof have a fiber diameter of 3-15 micron and a fiber length of 2-30 mm, and are bound to one another by carbonized resin such that, when a pore distribution in the porous electrode is determined with a mercury intrusion porosimeter, such that a pore distribution curve is plotted on a graph having a common logarithmic scale on the horizontal axis, and a 1-100 micron pore diameter range of the pore distribution curve includes 80 or more measurement points at equal intervals along the common logarithmic scale, the pore distribution has a skew-
(Continued)

ness S of $-2.0<S<-0.8$ and a kurtosis K of $3.5<K<10$ in the 1-100 micron pore diameter range.

20 Claims, 2 Drawing Sheets

(51) Int. Cl.
*H01M 8/1018* (2016.01)
*B32B 5/02* (2006.01)
*H01M 8/0234* (2016.01)
*H01M 8/0245* (2016.01)
*H01M 8/0239* (2016.01)

(52) U.S. Cl.
CPC ........ *H01M 8/0234* (2013.01); *H01M 8/0239* (2013.01); *H01M 8/0245* (2013.01); *H01M 8/1018* (2013.01); *H01M 2008/1095* (2013.01)

(56) References Cited

U.S. PATENT DOCUMENTS

| 2005/0100498 | A1 | 5/2005 | Nakamura et al. |
| 2007/0166524 | A1 | 7/2007 | Nakamura et al. |
| 2013/0323620 | A1 | 12/2013 | Tatsuno et al. |
| 2016/0204443 | A1 | 7/2016 | Tatsuno et al. |
| 2016/0365582 | A1* | 12/2016 | Kato ................... H01M 8/0243 |

FOREIGN PATENT DOCUMENTS

| EP | 1 939 156 A1 | 7/2008 |
| JP | 10-167855 A | 6/1998 |
| JP | 2004-134108 A | 4/2004 |
| JP | 2005-317240 A | 11/2005 |
| JP | 2009-234851 A | 10/2009 |
| JP | 5055682 B2 | 10/2012 |
| JP | 5260581 B2 | 8/2013 |
| KR | 10-2011-0078573 A | 7/2011 |
| WO | 2005/124907 A1 | 12/2005 |
| WO | 2007/037084 A1 | 4/2007 |

OTHER PUBLICATIONS

Extended European Search Report dated Jul. 24, 2017 in Patent Application No. 15857856.7.
Office Action dated Dec. 6, 2018 in Korean Patent Application No. 10-2017-7011170 (with unedited computer Generated English translation obtained by Global Dossier on May 28, 2019), 12 pages.
Combined Office Action and Search Report dated Jan. 28, 2019 in Chinese Patent Application No. 201580059420.X (with unedited computer Generated English translation obtained by Global Dossier on May 28, 2019). 13 pages.
Baolian, Y. "Fuel Cells-Theory, Technology, and Application", Chemical Industry Press, Aug. 2003, p. 184, paragraph 1 (with Full English translation).
Office Acton dated Jun. 3, 2019, in Korean Application No. 10-2017-7011170, (w/ English Translation obtained by Global Dossier on Aug. 20, 2019).
Office Action dated Jul. 16, 2019, in Chinese Application No. 201580059420, filed (w/ English Translation obtained by Global Dossier on Aug. 20, 2019).

* cited by examiner

POROUS ELECTRODE SUBSTRATE, MEMBRANE-ELECTRODE ASSEMBLY USING SAME, AND POLYMER ELECTROLYTE FUEL CELL USING SAME

TECHNICAL FIELD

The present invention relates to a porous electrode substrate applied for a polymer electrolyte fuel cell, a membrane-electrode assembly comprising the porous electrode substrate, and a polymer electrolyte fuel cell comprising the membrane-electrode assembly.

The present application is based upon and claims the benefit of priority to Japanese Application Nos. 2014-223950, filed Nov. 4, 2014, and 2015-196501, filed Oct. 2, 2015, the entire contents of which are incorporated herein by reference.

BACKGROUND ART

Polymer electrolyte fuel cells are required to have high conductivity and excellent current collection capability while exhibiting mechanical strength to withstand various operations. Also, the diffusion of substances that contribute to electrode reactions needs to be excellent in such fuel cells. To respond to such requirements, carbonized sheets are generally used as electrode substrates. Fuel cell applications that have attracted attention in recent years are those for automotives where high power density is required. In such applications fuel cells are operated in regions of high current density, and amount of water generated per unit reaction area increases. Accordingly, efficient discharge of water produced by reactions is the issue, and high dewatering capability is thereby required for carbonized sheets used as gas diffusion materials in fuel cells. Therefore controlling pore distributions in the electrode substrate has been attempted for the enhancement of dewatering capability.

For example, the objective of Patent Literature 1 is to provide a porous carbon material suitable for making electrodes such as those having high mechanical strength and excellent electrical characteristics and having a unimodal pore distribution with a clear peak. On the other hand, in Patent Literature 2, the target is set to have two types of pores: one, pores mechanically pierced in a sheet, and the other, voids among fibers of a non-woven fabric. However, neither is sufficient to achieve both mechanical strength and dewatering capability.

In addition, Patent Literature 3 introduces a method for blending powder of graphite, carbon black and the like. However, only a peak of those with a pore diameter of no larger than 1 μm is observed in the pore distribution, and thus no significant improvement in dewatering capability is achieved. Furthermore, Patent Literature 4 introduces a method for laminating layers formed under different press-molding conditions so as to obtain a porous carbon sheet having different pore distributions in a thickness direction. However, the sheet tends to warp due to different upper- and lower-side structures. In addition, those literatures do not clearly indicate how to set pore distributions for improving dewatering capability and enhancing fuel cell performance.

Patent Literature 5 provides cell performance testing that is not described in Patent Literatures 1-4: that is, by setting bimodal (two-peak) pore distributions, cell performance is enhanced over that of conventional unimodal pore distributions.

In automotive applications, it is required to maintain internal environment of a fuel cell stable under a wide variety of conditions; not only high power density conditions that corresponds to pressing down on the accelerator but also low power density conditions that corresponds to traveling at a constant speed. Namely, power must be generated in the presence of residual water under low temperature conditions such as at the startup of the fuel cell, while also be generated under high-temperature and wet conditions after the accelerator was pressed down on. Using a method described in Patent Literature 5, cell performance is improved only when power generation conditions are relatively constant such as in stationary applications, but no description is provided for different conditions. Accordingly, the method is not suitable for automotive applications.

Meanwhile, as methods for continuous sheet molding, intermittent pressing described in Patent Literatures 3 and 4, and double-belt pressing (DBP) described in Patent Literatures 5 and 6 are widely known. According to those literatures, in order to control the thickness, using a spacer or cotter is preferred at a part where pressure is applied and thickness is determined. However, no description is provided for controlling pore distributions in such a process.

The problem factor leading to a decrease in cell performance is insufficient gas supply caused by a clog in the substrate or separator passages, also known as flooding or plugging, that may instantaneously decrease power generation capability in a relatively low-temperature high-current-density region. On the other hand, under high-temperature and dry conditions, cell performance may be lowered by a decrease in proton conductivity as the electrolyte membrane dries, also known as a dry-up phenomenon.

Considering the above phenomena from the viewpoint of porous electrode substrates, conventional mainstream porous electrode substrates, either paper or cloth type, show a highly symmetrical pore distribution peak. Namely, pore diameters are substantially uniform in the entire substrate, and it is not clear what routes are taken by the fuel gas and reaction-produced water to enable the gas to diffuse and pass through. Accordingly, when a route is clogged by the produced water, gas diffusion is blocked, and drying accelerates once it starts, thereby resulting in a dry-up phenomenon.

Considering those problems, what are desired are porous electrode substrates adaptable to a wide range of fuel cell conditions from low-temperature and wet conditions to high-temperature and dry conditions.

CITATION LIST

Patent Literature

Patent Literature 1: JPH10-167855A
Patent Literature 2: JP2005-317240A
Patent Literature 3: JP5055682B
Patent Literature 4: JP2009-234851A
Patent Literature 5: JP5260581B
Patent Literature 6: JP2004-134108A

SUMMARY OF THE INVENTION

Problems to be Solved to be Solved by the Invention

The objective of the present invention is to provide a porous electrode substrate that works for automotive applications by keeping internal environment of a fuel cell stable under a wide variety of conditions; not only high power density conditions that corresponds to pressing down on the accelerator but also low power density conditions that corresponds to traveling at a constant speed.

More specifically, the objective of the present invention is to provide a porous electrode substrate adaptable to a wide variety of cell conditions, from low-temperature wet conditions to high-temperature dry conditions. Also, the objective is to provide a membrane-electrode assembly and a polymer electrolyte fuel cell comprising such a porous electrode substrate.

Solutions to the Problems

The inventors of the present invention have found that the aforementioned problems are solved by the aspects (1)~(11) of the present invention described below.

(1) A porous electrode substrate, in which carbon fibers having a fiber diameter of 3~15 μm and a fiber length of 2~30 mm are dispersed and bound with carbonized resin. When the pore distribution in the porous electrode substrate is determined using a mercury intrusion porosimeter, the following conditions are satisfied.
<Conditions>
The pore distribution curve is plotted on a graph having a common logarithmic scale on the horizontal axis, the 1~100 μm pore diameter range consists of at least 80 plotting points set at a constant interval on the common logarithmic scale, and the distribution has a skewness (S) of −2.0<S<−0.8 and a kurtosis (K) of 3.5<K<10 in the 1~100 μm pore diameter range.

(2) A porous electrode substrate, in which carbon fibers having a fiber diameter of 3~15 μm and a fiber length of 2~30 mm are dispersed and bound with carbonized resin. When the pore distribution of the porous electrode substrate is determined using a mercury intrusion porosimeter, the following conditions are satisfied.
<Conditions>
The pore distribution curve is plotted on a graph having a common logarithmic scale on the horizontal axis, the 1~100 μm pore diameter range consists of at least 80 plotting points set at a constant interval on the common logarithmic scale, and the distribution has a skewness (S) of −2.0<S<−0.8 and a kurtosis (K) of 3.5<K<10 in the 1~100 μm pore diameter range, while having one peak in the 20~100 μm pore diameter range.

(3) A porous electrode substrate, in which carbon fibers having a fiber diameter of 3~15 μm and a fiber length of 2~30 mm are dispersed and bound with carbonized resin. When the pore distribution of the porous electrode substrate is determined using a mercury intrusion porosimeter, the following conditions are satisfied.
<Conditions>
The pore distribution curve is plotted on a graph having a common logarithmic scale set on the horizontal axis, the 1~100 μm pore diameter range consists of at least 80 plotting points set at a constant interval on the common logarithmic scale, and the distribution has a skewness (S) of −2.0<S<−0.8 and a kurtosis (K) of 3.5<K<10 in the 1~100 μm pore diameter range, while having no peak in the 1~20 μm pore diameter range.

(4) A porous electrode substrate, in which carbon fibers having a fiber diameter of 3~15 μm and a fiber length of 2~30 mm are dispersed and bound with carbonized resin. When the pore distribution of the porous electrode substrate is determined using a mercury intrusion porosimeter, the following conditions are satisfied.
<Conditions>
The pore distribution curve is plotted on a graph having a common logarithmic scale on the horizontal axis, the 1~100 μm pore diameter range consists of at least 80 plotting points set at a constant interval on the common logarithmic scale, and the distribution has a skewness (S) of −2.0<S<−0.8 and a kurtosis (K) of 3.5<K<10 in the 1~100 μm pore diameter range, while having one peak in the 20~100 μm pore diameter range but no peak in the 1~20 μm pore diameter range.

(5) The porous electrode substrate according to any of (1)~(4), in which the conditions are set to have only one peak in the 20~100 μm diameter range.

(6) The porous electrode substrate according to any of (1)~(5), in which when measured using the porous electrode substrate treated only for water repellency, voltage value (Vm) at cell temperature of 80° C., relative humidity of 65% and current density of 1.0 A/cm$^2$ is at least 0.5 V, and the ratio of voltage value (Vb) at cell temperature of 80° C., relative humidity of 42% and current density of 1.0 A/cm$^2$ to voltage value (Va) at cell temperature of 80° C., relative humidity of 100% and current density of 1.0 A/cm$^2$ is Vb/Va=0.7~1.1.

(7) The porous electrode substrate according to any of (1)~(6), in which when measured using the porous electrode substrate treated only for water repellency, voltage value (Vm) at cell temperature of 80° C., relative humidity of 65% and current density of 1.0 A/cm$^2$ is at least 0.5 V, and the ratio of voltage value (Va) at cell temperature of 80° C., relative humidity of 100% and current density of 1.0 A/cm$^2$ to the voltage value (Vm) is Va/Vm=0.8~1.2, while the ratio of voltage value (Vb) at cell temperature of 80° C., relative humidity of 42% and current density of 1.0 A/cm$^2$ to the voltage value (Vm) is Vb/Vm=0.7~1.1.

(8) A porous electrode substrate, comprising a coating layer made of carbon powder and a water repellent formed on either surface and/or both surfaces of the porous electrode substrate according to any of (1)~(7).

(9) A membrane-electrode assembly, comprising a porous electrode substrate according to any of (1)~(8)

(10) A polymer electrolyte fuel cell, comprising the membrane-electrode assembly according to (9).

(11) A method for producing a porous electrode substrate, including steps 1~4 below, and the hot-pressing process in step 3 is conducted using a hot-pressing apparatus and the clearance between surfaces of pressing plates of the apparatus is set to be 15~45% of the thickness of a resin-impregnated sheet.
step 1: a step for producing a carbon-fiber sheet material by dispersing carbon fibers (A) in water;
step 2: a step for forming a resin-impregnated sheet by impregnating a thermosetting resin into the carbon-fiber sheet material;
step 3: a step for hot pressing the resin-impregnated sheet after step 2 at a temperature range of 100~400° C. to obtain a resin-cured sheet; and
step 4: a step for carbonizing the resin-cured sheet after step 3 at a temperature of 1000° C. or higher to obtain a porous electrode substrate.

Effects of the Invention

According to the present invention, a porous electrode substrate is provided, which is adaptable to a wide variety of fuel cell conditions from low-temperature and wet conditions to high-temperature and dry conditions. Also provided are a membrane-electrode assembly and a polymer electrolyte fuel cell comprising such a porous electrode substrate.

DETAILED DESCRIPTION OF THE EMBODIMENTS

The present invention is described below in further detail.
<Porous Electrode Substrate>

The porous electrode substrate related to the present invention is formed with carbon fibers having a fiber diameter of 3~15 µm and a fiber length of 2~30 mm that are dispersed in a structure and are bound with a carbonized resin. When the pore distribution of the porous electrode substrate is determined using a mercury intrusion porosimeter, the distribution is characterized by satisfying the following conditions.
<Conditions>

The pore distribution curve is plotted on a graph having a common logarithmic scale on the horizontal axis, the 1~100 µm pore diameter range consists of at least 80 plotting points set at a constant interval on the common logarithmic scale, and the distribution has a skewness (S) of −2.0<S<−0.8 and a kurtosis (K) of 3.5<K<10 in the 1~100 µm pore diameter range of pore distribution.

Figure 2:
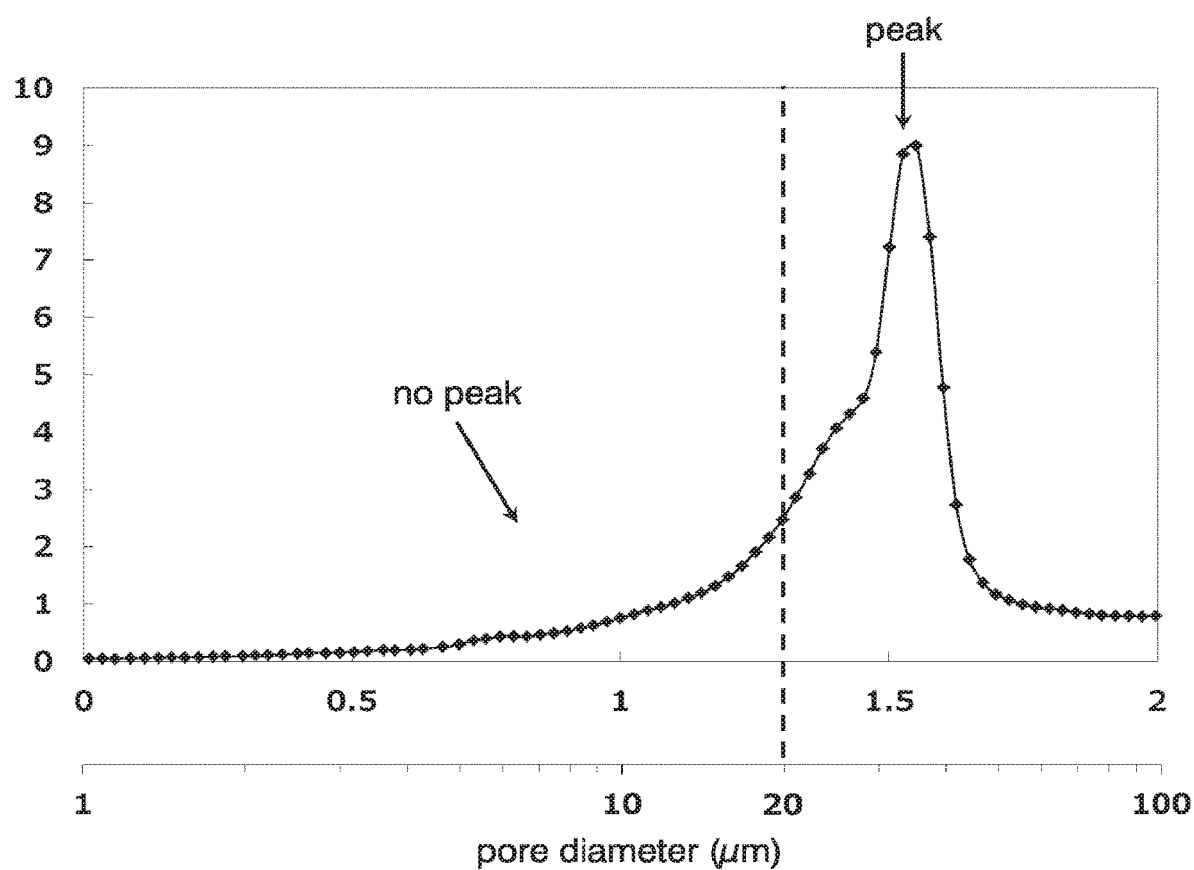
FIG. 2 is a graph representing a pore distribution showing no peak in the 1~20 µm diameter range and one peak in the 20~100 µm diameter range.

As for the above conditions, to secure dewatering passages for better power generation under wet conditions, the pore distribution is further preferred to have one peak in the pore diameter range of 20 µm~100 µm. In addition, to retain moisture for better power generation under dry conditions, it is necessary to have a certain pore volume in the pore diameter range of 1~20 µm. However, no peak is preferred to be observed in the pore diameter range of 1~20 µm to prevent acceleration of a dry-up or flooding phenomenon caused by uneven distribution biased toward a certain pore diameter. Yet furthermore, to secure well balanced gas and water passages under any setting of temperature and humidity in automotive applications, it is preferred to have only one peak in the pore diameter range of 20~100 µm as shown in FIG. 2. FIG. 2 is a pore distribution curve obtained by measuring the porous electrode substrate related to the present embodiment using a mercury intrusion porosimeter: the horizontal axis is the scale for plotting pore diameters of a sample converted using a cylinder approximation and the vertical axis is the scale for pore volumes.
<Fuel Cell Performance of Porous Electrode Substrate>

The power generation performance of a porous electrode substrate related to the present invention is defined as follows.

Porous electrode substrates are immersed in a polytetrafluoroethylene (PTFE) dispersion, dried and sintered to prepare porous cathode and anode substrates (PTFE adhesion amount of 20 weight %). Also, a laminate is prepared by forming a catalyst layer (area of catalyst layer: 25 cm², Pt adhesion amount: 0.3 mg/cm²) made of catalyst carrying carbon (catalyst: Pt, amount of carried catalyst: 50 weight %) on each of both surfaces of a perfluorosulfonic acid-based polymer electrolyte membrane (membrane thickness: 30 µm). Next, the laminate is sandwiched with the porous cathode and anode substrates, which are then bonded together to form an MEA (membrane-electrode assembly). The MEA is sandwiched with two sheets of carbon separators having serpentine-type flow channels to form a polymer electrolyte fuel cell (single cell). Then, using hydrogen gas as the fuel gas (utilization rate of 60%) and air as the oxidation gas (utilization rate of 40%), the current density-voltage characteristics are determined. When the voltage value is (Va) at cell temperature of 80° C., relative humidity of 100% (wet condition) and current density of 1.0 A/cm², and the voltage value is (Vb) at cell temperature of 80° C., relative humidity of 42% (dry condition) and current density of 1.0 A/cm², the ratio of Vb/Va is preferred to be 0.7~1.1. A Vb/Va value smaller than 0.7 is not desired, since it means preferable conditions for generating power deviate toward the wet side, likely causing a dry-up phenomenon. A Vb/Va value exceeding 1.1 is not desired either, since it means preferable conditions for generating power deviate toward the dry side, likely causing a flooding phenomenon.
<Carbon Fiber>

As for the type of carbon fibers to form a porous electrode substrate related to the present invention, polyacrylonitrile-based carbon fibers (hereinafter referred to as "PAN-based carbon fibers"), pitch-based carbon fibers, or rayon-based carbon fibers cut to desired lengths may be used. Among them, PAN-based carbon fibers are preferred, considering the mechanical strength of a porous electrode substrate.

The average length of carbon fibers is preferred to be 2~30 mm from a viewpoint of dispersibility. To obtain the average length, carbon fibers are photographed at a magnification of 50 times or more by using a scanning electron microscope or the like, and 50 monofilaments are picked at random in the photograph to measure their lengths and calculate their average value. The average fiber diameter of carbon fibers is preferred to be 3~15 µm, considering production costs and dispersibility of carbon fibers, while it is more preferred to be 4~8 µm to achieve a smooth surface of porous electrode substrate.
<Carbonized Resin>

In the present application, carbonized resins are substances made by carbonizing resins and used for binding carbon fibers. Resins are not limited to any specific type. Preferred are thermosetting resins such as phenolic resins, which exhibit strong binder effects with carbon fibers and have a higher residual weight when carbonized. Depending on the resin types and their impregnation amounts into carbon fiber sheets, carbonized resins show different rates ultimately remaining as carbons in a porous electrode substrate.
<Mercury Intrusion Porosimetry>

The pore distribution in the present application is determined and defined as follows. A mercury intrusion porosimetry is employed for determining the pore distribution of a porous material. A "pore distribution curve" is defined as follows: a "cumulative pore volume curve" is plotted on a graph where a horizontal axis is scaled for plotting pore diameters of a sample converted from the applied pressures on the sample through cylindrical approximation formula and a vertical axis is scaled for plotting the total volumes of mercury intruded into pores; and a pore distribution curve is obtained by differentiating the cumulative pore volume curve with respect to pore diameters as the variable.
<Pore Distribution>

Figure 1:
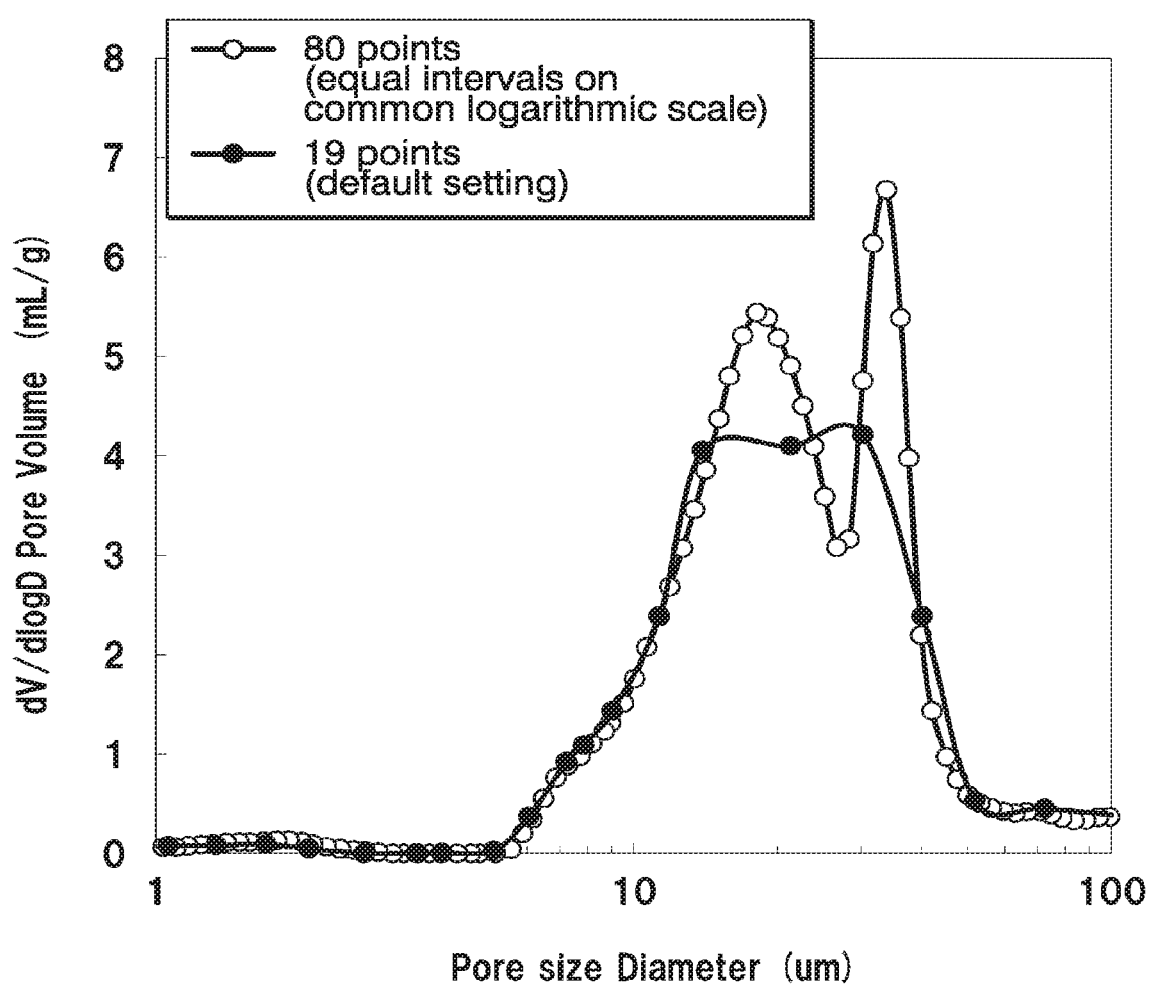
FIG. 1 shows pore distribution profiles that vary depending on the number of data plotting points and their interval settings.

The pore distribution is usually plotted on a semi-logarithmic graph defined by a common logarithmic scale set on the horizontal axis. In default settings by manufacturers, pressures to be applied on a sample are set in advance to increase by approximately equal increments. When measured under such uniform pressure settings, the pore diameters are determined solely by cylinder approximation of applied pressures. Thus, on a semi-logarithmic graph, data plotted points for drawing a pore distribution curve are dense on the smaller diameter side (left on the graph) and sparse on the larger diameter side (right on the graph), which indicate that the pore distribution profile may vary depending on data plotting settings, namely, the setting of applied pressures. FIG. 1 shows examples of pore distribution curves obtained by changing the method for plotting data points when samples of the same porous electrode substrate were analyzed. As shown in FIG. 1, when measured using the default setting of a manufacturer (black dots), the interval between data plotting points in the horizontal axis direction is wider on the larger diameter side, and the curve obtained by connecting all the data points is observed to have a rather obtuse peak as a whole. By contrast, when measured using the method specified in the present application (white dots), since there are more data plotting points than are available in the default setting, a bimodal pore distribution inherently characterized in the porous electrode substrate is clearly displayed. As described, setting the applied pressure levels is remarkably important in analyzing the pore distribution.

Therefore, to set data plotting points for drawing a pore distribution curve at equal intervals on a semi-logarithmic graph (to prevent a range with sparse data points in the horizontal axis direction on a semi-logarithmic graph), the interval of applied pressures was obtained by backward calculation. Here, "equal intervals" mean data plotting points are set at certain intervals where no wider or narrower intervals exist in the horizontal axis direction on a semi-logarithmic graph. The smaller the data interval, the more precise is the profile that is obtained, but approximately 80 points are preferred in the 1~100 μm range to avoid an increase in measurement time. On the other hand, to precisely evaluate the pore distribution profile of a porous electrode substrate, it is preferred to also obtain data in regions where pore diameters are less than 1 μm and beyond 100 μm. In the present embodiment, a total of 144 applied pressure levels are set in the range that corresponds to converted pore diameters of approximately 0.08 μm to 400 μm.

To obtain such data, based on an applied pressure value (A), the subsequent applied pressure value (B) is set to satisfy B=10^0.025×A≈1.06×A. Namely, the values set for applied pressures are represented by a geometric progression with a common ratio of 1.06.

When there are 80 data plotting points in the 1~100 μm range, the data interval on the semi-logarithmic graph will be approximately 10^0.025≈1.06 [μm], and pore distribution is plotted with a resolution of approximately 1 μm.

<Skewness, Kurtosis>

From the viewpoint of statistics, the pore distribution is a type of frequency distribution. Thus, a distribution profile is defined by the "skewness" and "kurtosis" of the distribution generally used in statistical analysis.

The skewness (S) is the expected value obtained by raising the standard deviation to the power of 3, and indicates the degree of deviation of the distribution. The skewness (S) is defined that S=0 when a distribution is normal, S>0 when it deviates to the left, and S<0 when it deviates to the right. In the present application, "the skewness is greater" means "the absolute value of skewness is greater," and "the skewness is less" means "the absolute value of skewness is less."

The kurtosis (K) is the expected value obtained by raising the standard deviation to the power of 4, and indicates the degree of sharpness of a distribution profile. Although it may vary depending on the definition of kurtosis (K), usually K=3 for a normal distribution, K>3 for a "sharp peak distribution" where the peak is sharper than in a normal distribution, and K<3 for an "obtuse peak distribution" where the peak is more obtuse than in a normal distribution.

When statistical processing is conducted in the present application, the numerical values on the horizontal axis are converted in advance to indices with 10 as the base. More specifically, since 1, 10 and 100 are obtained respectively by raising 10 to the power of 0, 1 and 2, the point corresponding to 1 μm of the horizontal axis is converted to "0", 10 μm to "1" and 100 μm to "2". The same statistical processing applies to other points by converting them to indices with 10 as the base. When there are 80 data plotting points in the 1~100 μm range, the data interval after the index conversion is 2÷80=0.025.

Formulas (1) and (2) below respectively show the definitions to express skewness (S) and kurtosis (K) in a frequency distribution. When the formulas are applied to a pore distribution, the sum of the products obtained by multiplying pore diameters ($X_i$) represented by indices and their corresponding frequencies (intensities) ($f_i$) is divided by the sum of frequencies (intensities) to calculate the expected value ($\mu$). Based on the definition of formulas, the expected value obtained by raising ($Z_i = X_i - \mu$) to the power of 3 is the skewness (S), and the expected value obtained by raising it to the power of 4 is the kurtosis (K).

[math 1]

$$\alpha_3 = \frac{1}{\sum\limits_{i=1}^{n} f_i} \sum_{i=1}^{n} f_i Z_i^3 \qquad (1)$$

[math 2]

$$\alpha_4 = \frac{1}{\sum\limits_{i=1}^{n} f_i} \sum_{i=1}^{n} f_i Z_i^4 \qquad (2)$$

When the pore distribution curve is asymmetrical, that is, when the peak is skewed to the right or left of a graph, it indicates that pore diameters are not uniform and there are pores of various sizes. Such a substrate is expected to have separate diffusion routes to a certain extent; for example, produced water passes preferably through larger pores because of the contact angle, while the fuel gas passes through smaller pores that are not blocked by water. A preferred pore distribution curve is asymmetrical with a peak deviating significantly to the right (longer tail to the left). A pore distribution is obtained when the total volume of voids corresponding to a certain pore diameter (voids into which mercury is intruded) is plotted with respect to the pore diameter. Thus, when the total volume of smaller pore diameters (the left side of a graph) is greater (intense), the voids with smaller diameters is indicated to be more populous. Namely, the gas and water passages are well balanced, meaning dewatering is excellent under relatively low-temperature and high current density conditions, while moisture retention is excellent under high-temperature low-humidity conditions.

<Performance of Porous Electrode Substrate>

The performance of a porous electrode substrate defined in the present application is determined by methods (1) and (2) below.

(1) Forming Membrane-Electrode Assembly (MEA)

Water-repellency treatment is conducted on a porous electrode substrate by immersing the substrate in a PTFE dispersion, then by drying and sintering the substrate. Water-repellent porous electrode substrates are prepared for porous cathode and anode substrates. Also, a laminate is prepared by forming a catalyst layer (area of catalyst layer: 25 cm$^2$, Pt adhesion amount: 0.3 mg/cm$^2$) made of catalyst carrying carbon (catalyst: Pt, amount of carried catalyst: 50 weight %) on each of both surfaces of a perfluorosulfonic acid-based polymer electrolyte membrane (membrane thickness: 30 μm). Then, the laminate is sandwiched with the porous cathode and anode substrates, which are then bonded to form an MEA.

(2) Evaluation of Characteristics of MEA in Fuel Cell

A polymer electrolyte fuel cell (single cell) is formed by sandwiching the MEA with two carbon separators having serpentine-type flow channels. Current density-voltage characteristics of a single cell are determined to evaluate fuel cell characteristics. Hydrogen gas is used as the fuel gas and air as the oxidation gas. The single cell temperature is set at 80° C. with a fuel gas utilization rate of 60% and an oxidation gas utilization rate of 40%. The fuel gas and oxidation gas are humidified by being passed through an 80° C. (relative humidity of 100%) or 60° C. (relative humidity of 42%) bubbler. The voltage value is set as (Va) at cell temperature of 80° C., relative humidity of 100% and current density of 1.0 A/cm$^2$, and the voltage value is set as (Vb) at cell temperature of 80° C., relative humidity of 42% and current density of 1.0 A/cm$^2$, and the ratio Vb/Va is obtained.

To sufficiently secure the output power of an automotive at normal conditions, when the porous electrode substrate related to the present invention is treated only for water repellency, voltage value (Vm) at cell temperature of 80° C., relative humidity of 65% and current density of 1.0 A/cm$^2$ is preferred to be at least 0.5 V. Also, the ratio of voltage value (Vb) at cell temperature of 80° C., relative humidity of 42% and current density of 1.0 A/cm$^2$ to voltage value (Va) at cell temperature of 80° C., relative humidity of 100% and current density of 1.0 A/cm$^2$, is preferred to be Vb/Va=0.7~1.1.

In addition, to maintain balance among times of startup, constant speed and acceleration of the vehicle, when the porous electrode substrate related to the present invention is treated only for water repellency, voltage value (Vm) at cell temperature of 80° C., relative humidity of 65% and current density of 1.0 A/cm$^2$ is preferred to be at least 0.5 V. Also, the ratio of voltage value (Va) at cell temperature of 80° C., relative humidity of 100% and current density of 1.0 A/cm$^2$ to the voltage value (Vm) is preferred to be Va/Vm=0.8~1.2, while the ratio of voltage value (Vb) at cell temperature of 80° C., relative humidity of 42% and current density of 1.0 A/cm$^2$ to the voltage value (Vm) is preferred to be Vb/Vm=0.7~1.1.

<Method for Producing Porous Electrode Substrate>

A porous electrode substrate related to the present invention is produced by a method that includes steps 1~4 below, and the hot pressing in step 3 is conducted using a hot-pressing apparatus set to have a clearance between pressing plates of the apparatus at 15~45% of the thickness of a resin-impregnated sheet.

step 1: a step for producing a carbon-fiber sheet material by dispersing carbon fibers (A) in water (step 1: sheet material production process);

step 2: a step for forming a resin-impregnated sheet by impregnating a thermosetting resin in the carbon-fiber sheet material (step 2: resin impregnation process);

step 3: a step for hot pressing the resin-impregnated sheet after step 2 at a temperature range of 100~400° C. to obtain a resin-cured sheet (step 3: hot-pressing process); and step 4: a step for carbonizing the resin-cured sheet after step 3 at a temperature of 1000° C. or higher to obtain a porous electrode substrate (step 4: carbonization process).

In step 1: sheet material production process, it is an option to use deionized water, to disperse carbon fibers (A) and fibrillar fibers (b') in water, or to make sheet material by adding an organic polymer binder such as polyvinyl alcohol to the mixed slurry. It is preferred to dry at 90~120° C. (step 6: first drying process) the obtained carbon-fiber sheet material before step 2: resin impregnation process.

It is an option to form carbon-fiber sheet material in the step 1: sheet material production process by dispersing carbon fibers (A) and fibrillar fibers (b') in water, and it is another option to conduct a step for entangling the carbon-fiber sheet material (step 5: entanglement process) between step 1: sheet material production process and step 2: resin impregnation process. Either way, carbon fibers (A) are expected to open into monofilaments, and the strength of the carbon-fiber sheet is enhanced.

Moreover, between step 2: resin impregnation process and step 4: carbonization process, a step is conducted for hot pressing the resin-impregnated sheet at a temperature range of 100~400° C. (step 3: hot-pressing process).

Furthermore, step 7: second drying process may further be included to dry the entangled carbon-fiber sheet material (entangled-structure sheet). During that time, to remove the dispersion medium from the entangled carbon-fiber sheet material, it is preferred to dry the entangled carbon-fiber sheet material again at 20~200° C.

In step 4: carbonization process, to provide sufficient conductivity for the porous electrode substrate, carbonization is preferred to be conducted in an inert atmosphere set to have a temperature of 1000~2400° C. Prior to such a carbonization process, a pre-carbonization process may be conducted in an inert atmosphere set to have a temperature of 300~1000° C. When a pre-carbonization process is performed, it is easier to fully exhaust decomposition gases containing a significant amount of sodium generated in an initial stage of carbonization, thereby suppressing various decomposed substances from being adhered to or deposited on the inner walls of a carbonization furnace, while suppressing corrosion of the furnace walls or formation of black stains on the resin-cured sheet caused by decomposed substances.

In the following, processing steps and terminologies used in the steps are described in detail.

<Step 1: Sheet Material Production Process.>

To form a pore distribution specified in the present invention, a carbon-fiber sheet material is formed to contain carbon fibers (A) and fibrillar fibers (b'). When fibrillar fibers (b') are entangled with carbon fibers (A), the strength of carbon-fiber sheet material is enhanced. Moreover, carbon fiber precursors (b) may further be mixed in to make the sheet substantially binder-free. Alternatively, an organic polymer compound may be used as the binder. The organic polymer compound as a binder is not limited to any specific type, and polyvinyl alcohol (PVA) and heat-fusible polyester or polyolefin binders and the like may be used. Binders may be liquid or solid such as fibers and particles.

The weight ratio of a binder to a carbon-fiber sheet material is preferred to be binder/carbon-fiber sheet material=0.10~0.20, more preferably 0.12~0.18.

As a medium to disperse fiber materials such as carbon fibers (A), fibrillar fibers (b') and carbon fiber precursors (b), water or alcohol that does not dissolve fiber materials may be used. From a productivity viewpoint, water is preferred.

The carbon-fiber sheet material may be produced by a continuous or batch method. It is preferred to employ a continuous method, considering the productivity and mechanical strength of carbon-fiber sheet materials. The basis weight of a carbon-fiber sheet material is preferred to be approximately 10~200 g/m$^2$. The thickness of a carbon-fiber sheet material is preferred to be approximately 20~400 μm.

The weight ratio of fibrillar fibers (b') to a carbon-fiber sheet material is preferred to be fibrillar fibers (b')/carbon-fiber sheet material=0.05~0.35, more preferably 0.10~0.33.

<Step 2: Resin Impregnation Process>

As for the thermosetting resin to be impregnated into a carbon-fiber sheet material, preferred are those that are adhesive and fluid at normal temperatures and that remain as a conductive substance after carbonization, for example, phenolic resins, furan resins or the like. Preferred phenolic resins are resol-type phenolic resins obtained through phenol-aldehyde reactions in the presence of an alkali catalyst. It is also an option to add a solid heat-fusible novolac phenolic resin, which is produced by a known method through phenol-aldehyde reactions in the presence of an acidic catalyst, to a fluid resol-type phenolic resin. In such a method, it is preferred to employ a self-crosslinking type that contains hexamethylenediamine, for example, as a curing agent. Commercially available phenolic resins may be used.

Examples of a phenol are phenols, resorcinols, cresols, xylols and the like. Examples of an aldehyde are formalin, paraformaldehyde, furfurals and the like. They may be used alone or in combination thereof.

To reduce production costs, water-dispersible phenolic resins or water-soluble phenolic resins may be used.

Examples of a water-dispersible phenolic resin are resol-type phenolic resin emulsions described in JP2004-307815A, JP2006-56960A and the like, or any known water-dispersible phenolic resins or what we call water dispersions. Specific examples are Phenolite TD-4304 and PE-602, made by DIC Corporation, Sumilite Resin PR-14170, PR-55464 and PR-50607B, made by Sumitomo Bakelite Co., Ltd., Shownol BRE-174 made by Showa Denko K.K., and the like.

Examples of a water-soluble phenolic resin are known water-soluble phenolic resins such as resol-type phenolic resins with excellent water solubility shown in JP2009-84382A and the like. Specific examples are Resitop PL-5634, made by Gun Ei Chemical Industry Co., Ltd., Sumilite Resin PR-50781, PR-9800D and PR-55386, made by Sumitomo Bakelite, Shownol BRL-1583 and BRL-120Z, made by Showa Denko, and the like.

When obtaining a water-dispersible or water-soluble phenolic resin, it is preferred to select water dispersions or particles with easier commercial availability considering production costs and ease of handling. Compared with regular phenolic resins, when commercially available water-dispersible phenolic resins are used, there are less residual organic solvents or unreacted monomers that are not removed during production. Since there are less organic solvents and unreacted monomers that vaporize during a drying process and hot-pressing process, the exhaust system is made simpler or the like, thereby reducing production costs.

The adhered solid component of a thermosetting resin relative to the resin-impregnated sheet obtained by impregnating the thermosetting resin into a carbon-fiber sheet material is preferred to be 55~100 wt. % (weight ratio: thermosetting resin/carbon-fiber sheet material). When the adhered solid amount of a thermosetting resin is 55 wt % or higher, the porous carbon electrode substrate is denser, thus enhancing its strength. When the adhered solid amount of a thermosetting resin is 100 wt % or lower, porosity and gas permeability of the porous electrode substrate are well maintained. Here, a resin-impregnated sheet means what is obtained by impregnating a thermosetting resin into a carbon-fiber sheet material before being hot-pressed. If a solvent is used during resin impregnation, a resin-impregnated sheet means what is obtained by removing the solvent. The "solid component" of a thermosetting resin means "non-volatile component," indicating the residue that remains when a dispersion is heated to vaporize water, other solvents, or volatile monomers A solid component includes low-molecular compounds such as non-volatile monomers and oligomers. The weight ratio of fibrillar fibers (b') to the solid component of a thermosetting resin is preferred to be fibrillar fibers (b')/thermosetting resin solid component=0.1~0.75, more preferably 0.2~0.5.

It is an option to impregnate a mixture of a thermosetting resin and a conductive substance into a carbon-fiber sheet material. Examples of a conductive substance are carbon milled fibers, carbon black, acetylene black, graphite powder and the like. The content of the conductive substance to be mixed in is preferred to be 1~50 parts by mass per 100 parts by mass of a thermosetting resin. When the mixing amount of a conductive substance is 1 part by weight or more, the effects of improving conductivity are sufficient. However, since a mixing amount exceeding 50 parts by mass tends to saturate the effects of improved conductivity, a mixing weight of no higher than 50 parts by mass is preferable in terms of suppressing production costs.

To impregnate a solution containing a thermosetting resin and a conductive substance, if applicable, into a carbon-fiber sheet material, a preferred method is using squeeze rolls, or laminating a separately prepared thermosetting resin film on a carbon-fiber sheet material. When squeeze rolls are used, a carbon-fiber sheet material is immersed in an impregnation solution, and the absorbed liquid is coated homogeneously on the entire carbon-fiber sheet material by squeeze rolls while adjusting the liquid amount by changing the clearance of the rolls. When the viscosity of a solution is relatively low, a spray or the like may be used. For laminating a thermosetting resin film on a carbon-fiber sheet material, a solution containing a thermosetting resin as well as a conductive substance, if applicable, is coated on a release paper to form a thermosetting resin film. Then, the thermosetting resin film is laminated on a carbon-fiber sheet material, and the laminate is hot pressed so that the thermosetting resin is impregnated into the carbon-fiber sheet material.

<Step 3: Hot-Pressing Process>

In step 3: hot-pressing process, the thermosetting resin flows and is cured (crosslinked) so as to obtain a resin-cured sheet with a smooth surface and uniform thickness. When fibrillar fibers (b') are dispersed with carbon fibers (A) in step 1: sheet material production process, step 3: hot-pressing process also works to bind carbon fibers (A) with fused fibrillar fibers (b'). To flow and cure a thermosetting resin, especially phenolic resin, and to fuse fibrillar fibers (b'), hot pressing is preferred to be conducted at 150~380° C., more preferably 180~50° C. If the hot-pressing temperature is lower than 150° C., the crosslinking reaction of phenolic resin does not progress well, and the amount of carbon residue is low after carbonization. Also, formation of a phase separated structure is affected. A hot-pressing temperature of higher than 380° C. is not preferable since some of the fibrillar fibers (b') may be burned up during the hot-pressing step.

To conduct hot pressing, any technique may be used as long as the resin-impregnated sheet is sandwiched and hot pressed homogeneously by paired hot-pressing media. For example, both surfaces of a resin-impregnated sheet are hot pressed by using smooth-surface rigid plates, a hot roll-pressing apparatus or continuous belt-pressing machine. To hot press a resin-impregnated sheet continuously, it is preferred to use a hot-roll pressing apparatus or a continuous-belt pressing machine. Also, it is an option to convey a resin-impregnated sheet with intermittent hot pressing using smooth hard plates. Using those methods, step 4: carbonization can be conducted consecutively following step 3.

In the present invention, even during preheating, it is preferred to set a certain clearance between the aforementioned paired hot-pressing media (smooth-surface rigid plates, hot rolls or belts). Here, the clearance means a distance between the surfaces of paired and facing hot-pressing media in a hot-pressing apparatus. By adjusting the clearance, the mixed state (phase separated structure) of an organic polymer binder and a thermosetting resin is able to be controlled. At hot-pressing step, the thermosetting resin is cured while the aforementioned mixed state (phase separated structure) of the organic polymer binder and the thermosetting resin is maintained. At carbonization step, the organic polymer binder is burned up while the thermosetting resin remains as carbonized resin, resulting in pores with smaller size than those formed among carbon fibers. Namely, when the mixed state (phase separated structure) of an organic polymer binder and a thermosetting resin is changed, the distribution of the organic polymer binder that is later burnt will change accordingly, thus modifying the final pore distribution in the porous electrode substrate. More specifically, variations in change are sorted into <1>~<4> below.

<1> When the clearance of paired hot-pressing media during preheating is wider than approximately 60% of the thickness of a resin-impregnated sheet, the pressure applied on the resin-impregnated sheet is not so high, thus allowing the thermosetting resin and organic polymer binder to flow relatively freely. Accordingly, complete phase separation progresses between the thermosetting resin and organic polymer binder. As a result, a mesh structure with a smaller diameter is formed at a certain size after carbonization, and two peaks with a smaller skewness are formed.

<2> When the clearance of paired hot-pressing media during preheating is approximately 45% of the thickness of a resin-impregnated sheet, phase separation progresses in most portions, while no phase separation is formed in some portions. As a result, two peaks are formed, showing a greater skewness because of the portions that are not phase separated.

<3> When the clearance of paired hot-pressing media during preheating is approximately 30% of the thickness of a resin-impregnated sheet, phase separation occurs locally (in some portions). As a result, only the portions where phase separation has progressed have slightly smaller pore diameters, thus resulting in a pore distribution with the skewness and kurtosis defined in the present invention.

<4> When the clearance of paired hot-pressing media during preheating is narrower than approximately 15% of the thickness of a resin-impregnated sheet, a higher pressure is applied on the sheet in the preheating, which prevents the thermosetting resin and organic polymer compound from flowing freely. Accordingly, a mesh structure is not formed, resulting in one peak with a smaller skewness.

In the present invention, the clearance between paired hot-pressing media is preferred to be 15~45%, more preferably 20~40%, of the thickness of a resin-impregnated sheet. When the clearance of paired hot-pressing media is narrower than 15% of the thickness of a resin-impregnated sheet, the organic polymer binder is crushed by the pressure from the hot-pressing media, preventing phase separation from occurring, and resulting in a unimodal pore distribution with a smaller skewness.

On the other hand, if the clearance is wider than 45%, phase separation tends to progress, and the pore distribution is likely to be bimodal.

The pressure in hot pressing is preferred to be 1~20 MPa, more preferably 5~15 MPa. If the pressure is 20 MPa or lower, carbon fibers (A) will not be damaged during the hot-pressing process, and it is easier to provide appropriate density for the porous electrode substrate. If the pressure is 1 MPa or higher, it is easier to make smooth surfaces.

When a resin-impregnated sheet is hot pressed by being sandwiched between paired rigid plates, or by using a hot-roll pressing apparatus or a continuous belt pressing machine, it is preferred to coat a release agent on the rigid plates, rolls and belt or to insert a release paper between the resin-impregnated sheet and the rigid plates, hot rolls and belt to prevent adhesion of fiber materials. When a release paper is inserted, the clearance of the paired hot-pressing media is set in consideration of the thickness of the release paper.

<Step 4: Carbonization Process>

To carbonize the resin-cured sheet obtained by hot pressing a resin-impregnated sheet, any method may be employed as long as the resin is carbonized by a continuous temperature rise from room temperature. Carbonization is conducted at a temperature of 1000° C. or higher. To achieve sufficient conductivity, carbonization is preferred to be conducted in an inert atmosphere at 1000~2400° C. It is an option to conduct a pre-carbonization in an inert atmosphere at a temperature range of 300~1000° C. By conducting a pre-carbonization, it is easier to fully exhaust decomposition gases generated at an initial stage of carbonization. Thus, it is easier to suppress adhesion or deposition of decomposed substances such as sodium and calcium onto the inner wall of a carbonization furnace. Accordingly, corrosion of furnace walls and formation of black stains on the resin-cured sheet or porous electrode substrate are suppressed.

When a resin-cured sheet is continuously produced and carbonized, it is preferred to continuously conduct heat treatment on the entire length of the resin-cured sheet from the viewpoint of production costs. When a porous electrode substrate is made long, its productivity is high, and the subsequent production of membrane-electrode assembly (MEA) can also be conducted continuously. Accordingly, the production costs of a fuel cell are reduced. In addition, to reduce the production costs of a porous electrode substrate and a fuel cell, a porous electrode substrate is preferred to be rolled up continuously.

<Step 5: Entanglement Process>

When entanglement treatment is conducted on a carbon-fiber sheet material, a sheet is formed to have three-dimensionally entangled carbon fibers (A) (entangled-structure sheet). When fibrillar fibers (b') are dispersed with carbon fibers (A) in step 1: sheet material production process, entanglement treatment is conducted on the carbon-fiber sheet material so as to obtain a sheet with a three-dimensionally entangled structure of carbon fibers (A) and fibrillar fibers (b') (entangled-structure sheet).

The method for entanglement treatment is not limited specifically, but is selected as needed from among methods for forming an entangled structure. Examples are mechanical entanglement methods such as needle punching; high-pressure liquid jetting methods such as water-jet punching; high-pressure gas jetting methods such as steam-jet punching; or any combination thereof. Among them, high-pressure liquid jetting methods are preferred because it is easier to suppress breakage of carbon fibers (A) during the entanglement process and to obtain appropriate entangled structures.

In the following, high-pressure liquid jetting is described in detail.

High-pressure liquid jetting is conducted by placing a carbon-fiber sheet material on a support member with a substantially flat surface, and by jetting columnar liquid flows, conical liquid flows, slit liquid flows or the like on the sheet material at a pressure of 1 MPa or higher so as to entangle carbon fibers (A). When fibrillar fibers (b') are dispersed with carbon fibers (A) in step 1: sheet material production process, carbon fibers (A) and fibrillar fibers (b') are entangled together. Here, as for the substantially smooth support member, any material may be selected as long as no pattern of the support member is transferred to the resultant entangled structure and the jetted liquid is promptly drained therefrom. Specific examples are 30~200-mesh metallic wire or plastic nets, and rolls.

Considering productivity, it is preferred to perform entanglement treatment on the sheet material by using high-pressure liquid jetting or the like consecutively after carbon-fiber sheet material is formed on a support member with a substantially smooth surface.

Entanglement treatment on a carbon-fiber sheet material by high-pressure liquid jetting may be repeated multiple times. Namely, high-pressure liquid jetting is conducted on a carbon-fiber sheet material, another carbon-fiber sheet material is laminated thereon, and another round of high-pressure liquid jetting may be conducted on the laminate. Alternatively, a carbon-fiber sheet material in the midst of becoming entangled (sheet material with entangled structure) is inverted to be upside down, and another round of high-pressure liquid jetting may be conducted from the opposite side. Those treatments may also be repeated.

The liquid to be used for high-pressure liquid jetting is not limited specifically as long as it does not dissolve the fibers to be treated. Usually, deionized water is preferred and the water may be warm. The hole diameter of a jet nozzle for high-pressure liquid jetting is preferred to be 0.06~1.0 mm, more preferably 0.1~0.3 mm, if it is a columnar flow. The distance between nozzle and the laminate is preferred to be 0.5~5 cm. The liquid pressure is preferred to be 1 MPa or higher, more preferably 1.5 MPa or higher to entangle fibers. Single-row or multiple-row jetting may be employed for entanglement treatment. When multiple rows are used for jetting, it is effective to set the pressure of liquid jetting treatment on the second and subsequent rows to be higher than on the first row so as to maintain the shape of the sheet material.

When an entangled sheet is continuously produced, a striped trace pattern may be formed in the sheet formation direction, causing the sheet to have different densities. For that matter, such a trace pattern is suppressed by oscillating a high-pressure liquid jetting nozzle having single-row or multiple-row holes in the sheet width direction. The tensile strength in the sheet width direction can be improved by suppressing the striped trace pattern in the sheet formation direction. If multiple high-pressure liquid jetting nozzles having single- or multiple-row holes are used, formation of periodic patterns on the obtained entangled sheet is suppressed by controlling the number of oscillations and their respective phases when the multiple nozzles are oscillated in the sheet width direction.

Since the tensile strength of a carbon-fiber sheet material is enhanced by entanglement treatment, the tensile strength is maintained when the carbon-fiber sheet material is in water or in wet condition. Accordingly, a water-dispersible or water-soluble thermosetting resin can be added continuously to the entangled carbon-fiber sheet material. Since using a water-dispersible or water-soluble thermosetting resin eliminates the process of recovering an organic solvent, the production facility can be made simpler than conventional ones, thus reducing production costs.

<Step 6: First Drying Process>

Between step 2: resin impregnation process and step 3: hot pressing process, the production method related to the present invention may further include step 6: drying the resin-impregnated sheet. Adding such a process is preferred, since it makes it easier to reduce the energy used to remove the dispersion medium and unreacted monomers in step 3: hot pressing process.

To remove the dispersion medium and unreacted monomers from a resin-impregnated sheet, it is preferred to dry the resin-impregnated sheet at a temperature of 90~120° C. The drying process may be conducted for 1 minute to 24 hours, for example.

The drying method is not limited specifically; for example, heat treatment using a high-temperature atmospheric furnace or far-infrared heating furnace, direct heating treatment using a hot plate or hot rolls, and the like may be employed. Among them, a high-temperature atmospheric furnace or far-infrared heating furnace are preferred since these methods prevent thermosetting resins from adhering to the heat source. When a continuously produced resin-impregnated sheet is dried, from the viewpoint of production cost, it is preferred that the entire length of the sheet be dried continuously so as to allow step 6: first drying process and step 3: hot pressing process to be consecutively conducted.

<Step 7: Second Drying Process>

Between step 5: entanglement process and step 2: resin impregnation process, the production method related to the present invention may further include step 7: second drying process for drying the carbon-fiber sheet material after entanglement treatment (entangled-structure sheet). To remove the dispersion medium from the entangled carbon-fiber sheet material, it is preferred to dry the entangled sheet material at a temperature of 20~200° C. The drying process may be conducted for 1 minute to 24 hours, for example.

The drying method is not limited specifically; for example, heat treatment using a high-temperature atmospheric furnace or far-infrared heating furnace, direct heating treatment using a hot plate or hot rolls, and the like may be employed. Among them, a high-temperature atmospheric furnace or far-infrared heating furnace are preferred since these methods prevent the fibers of the entangled carbon-fiber sheet material from adhering to the heating source.

When the entangled carbon-fiber sheet material is continuously produced and dried, from the viewpoint of production cost the drying process is preferred to be conducted continuously on the entire length of the entangled sheet material so as to allow step 5: entanglement process and step 7: second drying process to be consecutively conducted.

<Fibrillar Fibers (b')>

When dispersed with carbon fibers (A), fibrillar fibers (b') prevent carbon-fibers (A) from bundling again and work to make the sheet material a self-supporting sheet. In addition, some thermosetting resins (for example, phenolic resins) may produce condensation water when cured, and fibrillar fibers are expected to absorb and discharge the water. Accordingly, it is preferred to use fibrillar fibers having affinity for water. Specific examples are synthetic pulps such as fibrillated polyethylene fibers, acrylic fibers and aramid fibers. It is an option to use fibrillar fibers (b') that leave carbon residue after carbonization (remain as carbon) or those that leave no carbon residue after carbonization (do not remain as carbon). The average fiber length of fibrillar fibers (b') is preferred to be 0.5 mm or longer with a view toward securing the mechanical strength of the resin-impregnated sheet, and 20 mm or shorter in consideration of dispersibility. The average diameter of the stems of fibrillar fibers (b') is preferred to be 1 μm or larger to enhance dispersibility and 50 μm or smaller to suppress fracture caused by heat shrink. Moreover, the average diameter of the fibril portions of fibrillar fibers (b') is preferred to be 0.01 μm or larger to secure dewatering capability during the production process of a carbon-fiber sheet material and gas permeability of the porous electrode substrate, whereas the average diameter is preferred to be 30 μm or smaller in terms of dispersibility.

<Carbon Fiber Precursors (b)>

Carbon fiber precursors (b) are those obtained by cutting long-fiber carbon fiber precursors to appropriate lengths. Long-fiber carbon fiber precursors are formed from later-described polymers (acrylic polymers, for example).

The average fiber length of carbon fiber precursors (b) is preferred to be 2~30 mm in view of dispersibility. The cross-sectional shape of carbon fiber precursors (b) is not limited specifically, but those with a high degree of roundness are preferred considering mechanical strength after carbonization and production cost. To make it easier to suppress breakage caused by heat shrink in step 5: heating process and step 3: carbonization process, the average fiber diameter of carbon fiber precursors (b) is preferred to be 5 μm or smaller. To enhance spinnability, the average fiber diameter of carbon fiber precursors (b) is preferred to be 1 μm or larger.

To maintain sheet form after carbonization, the polymer of carbon fiber precursors (b) is preferred to have a residual mass of 20% or higher during the carbonization process. Examples of such a polymer are acrylic polymers, cellulose-based polymers, phenolic polymers and the like.

The acrylic polymer to be used for carbon fiber precursors (b) may be a homopolymer of acrylonitrile, or copolymers with acrylonitrile and other monomers. Monomers to be copolymerized with acrylonitrile are not limited specifically as long as they are unsaturated monomers generally used for forming acrylic fibers. Examples are acrylic acid esters such as methyl acrylate, ethyl acrylate, isopropyl acrylate, n-butyl acrylate, 2-ethylhexyl acrylate, 2-hydroxyethyl acrylate, and hydroxypropyl acrylate; methacrylic acid esters such as methyl methacrylate, ethyl methacrylate, isopropyl methacrylate, n-butyl methacrylate, isobutyl methacrylate, t-butyl methacrylate n-hexyl methacrylate, cyclohexyl methacrylate, lauryl methacrylate, 2-hydroxyethyl methacrylate, hydroxypropyl methacrylate, and diethylaminoethyl methacrylate; acrylic acid, methacrylic acid, maleic acid, itaconic acid, acrylamide, N-methylol acrylamide, diacetone acrylamide, styrene, vinyl toluene, vinyl acetate, vinyl chloride, vinylidene chloride, vinylidene bromide, vinyl fluoride, vinylidene fluoride, and the like.

It is preferred to use an acrylic polymer containing an acrylonitrile unit at 50 weight % or higher considering spinnability, the capability to bind carbon fibers (A) with each other in a lower to higher temperature range, a higher residual amount after carbonization, and fiber elasticity and strength during entanglement treatment.

The weight-average molecular weight of an acrylonitrile-based polymer used for carbon fiber precursors (b) is not limited specifically, but 50,000 to 1,000,000 is preferred. A weight-average molecular weight of 50,000 or more is expected to enhance fiber quality while improving spinnability. A weight-average molecular weight of 1,000,000 or less is expected to increase the polymer concentration, providing optimum viscosity for the spinning dope, thus likely improving productivity.

The weight-average molecular weight is determined by gel permeation chromatography (GPC) or the like.

In a fuel cell, a porous electrode substrate sheet is seldom used as received. Normally, a coating layer made of a water repellent and carbon powder, called an MPL (micro porous layer), is formed on the substrate before being loaded in the cell. The porous electrode substrate related to the present invention exhibits excellent cell performance without an MPL, and adding an MPL is optional. Regardless of an MPL, water-repellency treatment is preferred to be conducted on the porous electrode substrate.

On the anode of a polymer electrolyte fuel cell, a humidified fuel gas is supplied to suppress the dryness of the polymer electrolyte membrane and to maintain appropriate proton conductivity. On the cathode, water (vapor) is produced as the product of electrode reactions, and the vapor can be condensed to be liquid water. Such liquid water may block the voids of a porous electrode substrate and may prevent gas permeation. Therefore, to secure gas permeability, water-repellency treatment is often conducted using a water repellent.

Examples of a water repellent are chemically stable and highly water repellent fluorine-based resins and silicone-based resins (silicones). Since silicones are low in acid resistance and unable to make contact with a strongly acidic polymer electrolyte membrane, fluorine-based resins are usually selected.

Fluorine-based resins are not limited to any specific type; examples are homopolymers or copolymers with fluorine-based monomers such as tetrafluoroethylene (TFE), hexafluoropropylene (HFP), vinylidene fluoride (VDF), chlorotrifluoroethylene (CTFE), vinyl fluoride, perfluoroalkyl vinyl ether, perfluoro(butenyl vinyl ether) (PBVE), and perfluoro(2,2-dimethyl-1,3-dioxole) (PDD). Also available are copolymers of those listed above with olefins such as ethylene: ethylene-tetrafluoroethylene copolymer (ETFE), ethylene-chlorotrifluoroethylene copolymer (ECTFE) and the like. Considering the ease of impregnation, fluorine-based resins are preferred to be those dissolved in a solvent or particles dispersed in a dispersion medium such as water or alcohol. Among them, those that are easier to obtain commercially in the form of solution, dispersion or particles are polytetrafluoroethylene (PTFE), tetrafluoroethylene-hexafluoropropylene copolymer (FEP), tetrafluoroethylene-perfluoroalkyl vinyl ether (PFA) and polyvinylidene fluoride (PVDF). It is preferred to use those listed above considering the ease of handling and production cost. The concentration of water repellent is preferred to be 5~60 wt % of the entire dispersion when the water-repellent is dispersed in a solvent.

To provide water repellency for a porous electrode substrate, for example, a dispersion of fluorine-based resin particles is prepared, into which the porous electrode substrate is dipped (dipping method), or which is sprayed on the substrate. The concentration of a fluorine-based resin dispersion is not limited specifically, but it is preferred to have 1~30 wt % of a solid component, more preferably 10~30 wt %, especially preferably 15~25 wt %, to prevent filling up the voids of the porous electrode substrate and to homogeneously adhere the fluorine-based resin to the substrate. Here, a "solid component" means a "nonvolatile component," that is, total residue after water or other solvents are vaporized when the dispersion is heated.

When PTFE is used as a fluorine-based resin, PTFE is preferred to be sintered. The sintering temperature needs to be set in a range that softens PTFE so as to allow PTFE to bind to carbon fibers and carbonized resins while preventing thermal decomposition of PTFE itself. It is preferred to be 300~390° C., especially preferably 320~360° C.

A fluorine-based resin is applied on a porous electrode substrate to externally coat macroscopic conductive passages formed by carbon fibers bound with a carbonized resin. Namely, a fluorine-based resin will be present on surfaces of conductive passages made of carbon fibers and carbonized resin without interrupting such passages. However, the majority of fluorine-based resin is found near where fibers are crossed. Applying a fluorine-based resin does not mean to fully coat surfaces of carbon fibers and carbonized resin of the porous electrode substrate. Therefore, even after the water-repellency treatment, conductive passages from the substrate surfaces to its inside are secured, and both water repellency and conductivity are achieved.

The number of fluorine-based resin application processes is not limited specifically, but a lower number is preferable for the purpose of reducing production costs. For multiple applications, the fluorine-based resin slurry may be the same, or the type or its concentration may be different. A fluorine-based resin to be added may be applied at a constant or gradient concentration in the thickness direction of a porous electrode substrate.

A coating layer (MPL) composed of carbon powder and a water repellent is a layer where carbon powder is bonded with a water repellent used as the binder. In other words, carbon powder is incorporated into a network formed by the water repellent so as to make a fine mesh structure. Since some of the composition seeps into the porous electrode substrate when an MPL is formed, it is hard to strictly define the border line between the MPL and the substrate. In the present application, only the portion where no MPL composition has seeped into a porous electrode substrate, that is, the layer made only of carbon powder and a water repellent, is defined as an MPL. The thickness of an MPL is preferred to be 5~50 µm.

Carbon powders for an MPL are carbon black, carbon powder, milled fibers and their mixtures, for example. Examples of carbon black are acetylene black (product name: Denka Black, made by Denka Co., Ltd.), Ketjenblack (product name: Ketjenblack E C, made by Lion Specialty Chemicals Co., Ltd.), furnace black (product name: Vulcan XC72, made by CABOT Corporation), channel black, lamp black, thermal black and the like.

As for graphite powder, examples are pyrolytic graphite, spherical graphite, flake graphite, lump graphite, amorphous graphite, artificial graphite, and expanded graphite. Milled fibers may be those produced by pulverizing virgin carbon fibers, or those recycled from carbon fiber-reinforced thermosetting resin molded products, carbon fiber-reinforced thermoplastic resin molded products, prepregs and the like. The concentration of carbon powder is preferred to be 5~30 wt % of the total dispersion when carbon powder is dispersed in a solvent.

The water repellent used for an MPL is not limited specifically; it may be the same as or different from that used for the water-repellency treatment for the porous electrode substrate.

As for solvents to disperse carbon powder and a water repellent, water or organic solvents may be used. Considering the hazards entailed in using organic solvents, cost performance and environmental load, water is preferred. When an organic solvent is used, it is preferred to use lower alcohols and acetone having affinity for water. The ratio of an organic solvent to water is preferred to be 0.5~2:1.

<Method for Producing Membrane-Electrode Assembly>

A membrane-electrode assembly contains a porous electrode substrate, catalyst layer, and electrolyte membrane.

Examples of a catalyst layer are those made of platinum-supported carbons.

As for the electrolyte membrane, those made of a perfluorosulfonic acid polymer or hydrocarbon polymer may be used.

Producing a membrane-electrode assembly includes preparing a laminate where a catalyst layer is laminated on each of both surfaces of an electrolyte membrane, followed by sandwiching and bonding the laminate with porous electrolyte substrates.

More specifically, porous cathode and anode substrates are prepared, while preparing a laminate using catalyst layers to be laminated on both surfaces of a polymer electrolyte membrane. Then, the laminate is sandwiched by the porous cathode and anode substrates, which are bonded together to obtain a membrane-electrode assembly.

<Method for Producing Polymer Electrolyte Fuel Cell>

A polymer electrolyte fuel cell is formed with a membrane-electrode assembly and separators.

A separator, also called a bipolar plate, has flow channels, and it is made of carbons or surface-finished metals.

Producing a polymer electrolyte fuel cell includes a step for sandwiching a membrane-electrode assembly with two carbon separators having serpentine-type flow channels.

EXAMPLES

In the following, the present invention is described in detail by referring to examples. However, the present invention is not limited to those examples.

Example 1

Prepared materials: polyacrylonitrile (PAN)-based carbon fibers (product name: Pyrofil TR50S, average fiber diameter: 7 µm, made by Mitsubishi Rayon Co., Ltd.) cut to have an average fiber length of 3 mm, polyvinyl alcohol (PVA) fibers (product name: VPB105-1, fiber length: 3 mm, made by Kuraray Co., Ltd), and polyethylene pulp (product name: SWP, made by Mitsui Chemicals Inc.). PAN-based carbon fibers, polyethylene pulp and PVA fibers at a ratio of 10:3:2 were charged into the slurry tank of a continuous wet papermaking machine with a short wire mesh, water was further added to the tank and the fibers were evenly dispersed and opened. When the fibers were fully dispersed, the web was discharged, passed onto the short wire mesh, and dried with a blower. Accordingly, a rolled carbon-fiber sheet material was obtained to have a width of 1000 mm and a basis weight of 20 g/m².

Next, the carbon-fiber sheet material was immersed in a methanol solution with a phenolic resin (product name: Phenolite J-325, made by DIC Corporation) so as to adhere 60 parts by mass of the phenolic resin to 100 parts by mass of the carbon-fiber sheet material. The sheet material was then slit to a width of 850 mm and a resin-impregnated sheet with adhered phenolic resin was obtained. Two of the resin-impregnated sheets were press-molded using a double-belt pressing machine. Preheating was conducted under conditions set to have a hot air temperature of 150° C. and preheating roll temperature of 235° C., while the vertical clearance of preheating rolls was adjusted to be 30% of the total thickness of two resin-impregnated sheets. Furthermore, hot pressing was conducted at a roll temperature of 260° C. and a pressure of 6.7 MPa. Here, the preheating roll temperature indicates the hot pressing temperature defined in the present application. As a result, an 850 mm wide×100 m long resin-cured sheet was obtained. Details are shown in Table 1.

The resin-cured sheet was set to travel through a sintering furnace (1 m wide) under a nitrogen gas ambience, and to further travel through a sintering furnace having a 6 m-long region with a temperature of 1600° C. or higher under a nitrogen gas ambience so as to be heat treated at a maximum temperature of 2000° C. After that, the sheet width of the resin-cured sheet was 700 mm.

A sample for pore distribution measurement was prepared by cutting the porous electrode substrate into a 50 mm square, which was further cut into rectangular pieces to store in a cell having 1.19 mL capacity.

Pore distribution was measured with a mercury intrusion porosimetry in a pressure range corresponding to converted pore diameters of approximately 80 nm to 400 μm by using AutoPore IV 9500 (V 1.07) made by Micrometrics. Measurement points were 144 set to cover the above range at equal intervals on a common logarithmic scale.

Examples 2~6

Compositions of carbon-fiber sheet materials in Examples 2~6 were all the same as that in Example 1. However, in Examples 4~6, the basis weight of the carbon-fiber sheet material was changed to 40 g/m², and the number of laminations in the double-belt pressing process was changed from two to one. As shown in Table 1, conditions of temperatures and the pressure of pressing rolls were changed respectively for sampling. Carbonization conditions were the same as those in Example 1.

Example 7

Prepared materials: PAN-based carbon fibers with an average fiber diameter of 7 μm and an average fiber length of 3 mm, acrylic fibers with an average fiber diameter of 4 μm and an average fiber length of 3 mm (product name: D122, made by Mitsubishi Rayon), and polyethylene pulp (product name: SWP, made by Mitsui Chemicals). A sheet material and a three-dimensionally entangled sheet were respectively produced by a continuous wet papermaking method and by entanglement treatment through continuous high-pressure water jetting as described below.

<Continuous Wet Papermaking>
(1) Defibration of Carbon Fibers (A)

PAN-based carbon fibers with an average fiber diameter of 7 μm and an average fiber length of 3 mm were dispersed in water to have a fiber concentration of 1% (10 g/L) and were defibrated through a disc refiner (made by Kumagai Riki Kogyo Co., Ltd.) to make defibrated fiber slurry (SA).
(2) Defibration of Carbon Fiber Precursors (b1)

Acrylic fibers with an average fiber diameter of 4 μm and an average fiber length of 3 mm (product name: D122, made by Mitsubishi Rayon) were dispersed in water at a fiber concentration of 1% (10 g/L) to make defibrated fiber slurry (Sb1).
(3) Defibration of fibrillar fibers (b')

Polyethylene pulp (product name: SWP, made by Mitsui Chemicals) was dispersed in water at a fiber concentration of 1% (10 g/L) to make defibrated fiber slurry (Sb').
(4) Preparation of Papermaking Slurry Carbon fibers (A), carbon fiber precursors (b1), fibrillar fibers (b') and dilution water were weighed so that the mass ratio of carbon fibers (A), carbon fiber precursors (b1) and fibrillar fibers (b') was set at 10:2:4 and the concentration of fibers in the slurry (hereinafter referred to as a flock) at 1.7 g/L. The mixture was then charged into the slurry feed tank. Polyacrylamide was further added and a papermaking slurry with a viscosity of 22 centipoise was prepared.
<Treatment Equipment>

The treatment equipment is equipped with a sheet material conveyor composed of a net drive part and a continuously rotating net made of 60 cm wide×585 cm long plain-woven plastic; a papermaking slurry feeder with a feed width of 48 cm and a feed amount of 30 L/min.; a vacuum dewaterer positioned under the net; and a high-pressure water jetting apparatus.
(5) Production of Carbon-Fiber Sheet Material and Three-Dimensional Entanglement Treatment by High-Pressure Water Jetting Using a metering pump, the papermaking slurry was fed onto the net of the treatment apparatus. The papermaking slurry was widened to have a predetermined width through a flow box which makes a uniform flow. After the slurry was left standing and was passed through a natural dewatering section, the slurry was completely dewatered by using a vacuum dewaterer. Then, the wet web with a target basis weight of 40 g/m² was loaded onto the net. Simultaneously with the completion of the process, using a water jet nozzle positioned downstream of the equipment, the wet web underwent water jetting with pressures of 1 MPa (nozzle 1), 2 MPa (nozzle 2) and 2 MPa (nozzle 3) in turn as entanglement treatment.

The entangled carbon-fiber sheet material was dried by using a pin tenter (product name: PT-2A-400, made by Tsujii Dyeing Machine Manufacturing Co., Ltd.) at 150° C. for 3 minutes. Accordingly, a three-dimensionally entangled sheet with a basis weight of 40 g/m² was obtained. In the three-dimensionally entangled sheet, carbon fiber precursors (1) and fibrillar fibers (b') were well dispersed.
(6) Resin Impregnation and Drying Next, a water dispersion of resol phenolic resin (product name: PR-14170, made by Sumitomo Bakelite) was prepared and diluted with pure water to have a solid resin component of 10 weight % of the water dispersion. The diluted dispersion was flowed over both surfaces of the three-dimensionally entangled sheet, one side at a time. The sheet was then squeezed to remove excess resin, and the moisture in the sheet was fully dried at 80° C. Accordingly, a resin-impregnated sheet was obtained, having a solid resin component of 90 parts by mass per 100 parts by mass of the three-dimensionally entangled sheet.

(7) Hot-Pressing and Carbonization

After the above procedures, a porous electrode substrate was obtained by conducting hot-pressing and carbonization steps the same as in Example 1 except that preheating hot air temperature was 150° C., preheating roll temperature was 205° C., vertical clearance between preheating rolls was 30% of the resin-impregnated sheet thickness, hot-pressing roll temperature was 235° C., and pressure was 5.0 MPa. The obtained sheet width was 450 mm.

Example 8

A porous electrode substrate was obtained the same as in Example 7 except that the papermaking slurry was prepared by setting carbon fibers (A), carbon fiber precursors (b1) and fibrillar fibers (b2) to have a mass ratio of 10:2:3.

Example 9

A porous electrode substrate was obtained the same as in Example 8 except that PAN-based carbon fibers with an average fiber diameter of 7 μm and an average fiber length of 6 mm were used as carbon fibers (A).

Comparative Example 1

Prepared materials: PAN-based carbon fibers (product name: Pyrofil TR50S, average fiber diameter: 7 μm, made by Mitsubishi Rayon) cut to have an average fiber length of 3 mm, polyvinyl alcohol (PVA) fibers (product name: VPB105-1, fiber length: 3 mm, made by Kuraray), and polyethylene pulp (product name: SWP, made by Mitsui Chemicals). PAN-based carbon fibers, polyethylene pulp and PVA fibers at a ratio of 10:8:2 were charged into the slurry tank of a continuous wet papermaking machine with a short wire mesh, water was further added to the tank and the fibers were evenly dispersed and opened. When the fibers were fully dispersed, the web was discharged, passed onto the short wire mesh, and dried with a blower. Accordingly, a rolled carbon-fiber sheet material was obtained to have a width of 1000 mm and a basis weight of 20 g/m².

Next, the carbon-fiber sheet material was immersed in a methanol solution with a phenolic resin (product name: Phenolite J-325, made by D1C) to adhere 50 parts by mass of phenolic resin per 100 parts by mass of the carbon-fiber sheet material. The sheet material was then slit to a width of 850 mm and a resin-impregnated sheet with adhered phenolic resin was obtained. Two of the resin-impregnated sheets were press-molded using a double-belt pressing machine. Preheating was conducted under conditions set to have a hot air temperature of 150° C. and a preheating-roll temperature of 235° C., while the vertical clearance of preheating rolls (distance between paired hot-pressing media) was adjusted to be 60% of the total thickness of two resin-impregnated sheets. Then, hot pressing was conducted at a roll temperature of 260° C. and a pressure of 8.6 MPa. As a result, an 850 mm wide×100 m long resin-cured sheet was obtained. Details are shown in Table 1. Carbonization conditions were the same as those in Example 1.

Comparative Example 2

A porous electrode substrate was prepared the same as in Comparative Example 1 except that the PAN-based carbon fibers, polyethylene pulp and PVA fibers were mixed at a ratio of 8:0:2, the vertical clearance of preheating rolls (distance between paired hot-pressing media) was adjusted to 0 μm, and the pressure of pressing rolls was 5.0 MPa.

From the results of Examples and Comparative Examples, it was confirmed that the pore distribution was controlled by adjusting the clearance of paired hot pressing media. As found in Comparative Example 2, when the clearance of paired hot pressing media was narrow, the polyethylene pulp was crushed by roll pressure and was unable to flow. Accordingly, no mesh structure was formed.

<Single Cell Performance Test>

Cell performance was tested using samples prepared in Examples and Comparative Examples of the present invention. The test method was as follows.

(1) Production of Membrane-Electrode Assembly (MEA)

A porous electrode substrate obtained in each of the examples was immersed in a PTFE dispersion, dried and sintered to conduct water-repellency treatment. Water repellent porous electrode substrates were prepared for porous cathode and anode substrates. Also, a laminate was prepared by forming a catalyst layer (area of catalyst layer: 25 cm², Pt adhesion amount: 0.3 mg/cm²) made of catalyst carrying carbon (catalyst: Pt, amount of carried catalyst: 50 wt %) on each of both surfaces of a perfluorosulfonic acid-based polymer electrolyte membrane (membrane thickness: 30 μm). The laminate was then sandwiched with the porous cathode and anode substrates, which were then bonded to form an MEA.

(2) Evaluation of MEA characteristics in fuel cell

The MEA was sandwiched by two carbon separators having serpentine-type flow channels to form a polymer electrolyte fuel cell (single cell). By measuring electric current density-voltage characteristics of the single cell, characteristics of the fuel cell were evaluated. Hydrogen gas was used as the fuel gas, and air was used as the oxidation gas. The temperature of the single cell was set at 80° C., the utilization rate of fuel gas at 60% and the utilization rate of oxidation gas at 40%. The fuel gas and oxidation gas were humidified by passing through an 80° C. (relative humidity of 100%), 70° C. (relative humidity of 65%) or 60° C. (relative humidity of 42%) bubbler. The voltage value was set as (Va) at cell temperature at 80° C., relative humidity of 100% and current density of 1.0 A/cm², the voltage value was set as (Vm) at cell temperature at 80° C., relative humidity at 65% and current density of 1.0 A/cm², and the voltage value was set as (Vb) at cell temperature at 80° C., relative humidity at 42% and current density of 1.0 A/cm², and then the ratios of Vb/Va, Va/Vm, and Vb/Vm were determined.

<Single Cell Performance Test Results, Analysis>

The results of cell performance testing are shown in Table 3. By using electrode substrates having pore distributions as shown in the Examples, it was confirmed that a single cell performs well under various conditions.

TABLE 1

|  | | Example 1 | Example 2 | Example 3 | Example 4 | Example 5 | Example 6 | Example 7 | Example 8 | Example 9 | Comp. Example 1 | Comp. Example 2 |
|---|---|---|---|---|---|---|---|---|---|---|---|---|
| Carbon fibers (A) [parts by mass] | | 10 | 10 | 10 | 10 | 10 | 10 | 10 | 10 | 10 | 10 | 8 |
| Fibril fibers (b') [parts by mass] | | 3 | 3 | 3 | 3 | 3 | 3 | 4 | 3 | 2 | 8 | 0 |
| Organic polymer binder [parts by mass] | | 2 | 2 | 2 | 2 | 2 | 2 | 0 | 0 | 0 | 2 | 2 |
| Precursor carbon fibers (b) [parts by mass] | | 0 | 0 | 0 | 0 | 0 | 0 | 2 | 2 | 2 | 0 | 0 |
| Total carbon-fiber sheet material [parts by mass] | | 15 | 15 | 15 | 15 | 15 | 15 | 16 | 15 | 14 | 20 | 10 |
| Thermosetting resin [parts by mass] | | 9 | 9 | 9 | 9 | 9 | 9 | 14.4 | 13.5 | 12.6 | 10 | 4 |
| Wt. ratio: fibril fibers (b')/carbon-fiber sheet material | | 0.20 | 0.20 | 0.20 | 0.20 | 0.20 | 0.20 | 0.25 | 0.20 | 0.14 | 0.40 | 0.00 |
| Wt. ratio: thermosetting resin/carbon-fiber sheet material | | 0.60 | 0.60 | 0.60 | 0.60 | 0.60 | 0.60 | 0.90 | 0.90 | 0.90 | 0.50 | 0.40 |
| Wt. ratio: fibril fibers (b')/thermosetting resin | | 0.33 | 0.33 | 0.33 | 0.33 | 0.33 | 0.33 | 0.28 | 0.22 | 0.16 | 0.80 | 0.00 |
| Basis weight: carbon-fiber sheet material [g/m$^2$] | | 20 | 20 | 20 | 40 | 40 | 40 | 40 | 40 | 40 | 20 | 25 |
| Number of resin-impregnated sheets laminated for hot pressing | | 2 | 2 | 2 | 1 | 1 | 1 | 1 | 1 | 1 | 2 | 2 |
| Hot pressing temperature [° C.] | | 235 | 235 | 235 | 238 | 238 | 235 | 205 | 205 | 205 | 230 | 220 |
| Mold clearance relative to thickness of resin-impregnated sheet [%] | | 30 | 30 | 30 | 30 | 30 | 30 | 30 | 30 | 30 | 60 | 0 |
| Hot pressing pressure [MPa] | | 6.7 | 13.6 | 8.1 | 5.6 | 8.1 | 5.3 | 5.0 | 5.0 | 5.0 | 8.6 | 5.0 |
| Sheet width [mm] | | 850 | 850 | 850 | 850 | 850 | 850 | 450 | 450 | 450 | 850 | 850 |
| Physical properties of porous electrode substrate | Thickness [μm] | 120 | 106 | 112 | 140 | 120 | 130 | 144 | 152 | 154 | 206 | 209 |
| | Basis weight [g/m$^2$] | 39 | 40 | 39 | 39 | 38 | 37 | 40 | 40 | 40 | 63 | 58 |
| | Density [g/cm$^3$] | 0.32 | 0.38 | 0.35 | 0.28 | 0.32 | 0.28 | 0.28 | 0.26 | 0.26 | 0.31 | 0.28 |
| | Resistance in thickness direction [mΩ·cm$^2$] | 4.2 | 3.7 | 4.2 | 5.3 | 4.2 | 4.6 | 6.2 | 6.6 | 5.0 | 5.7 | 7.5 |
| | Gas permeability in thickness direction [mL/cm$^2$/hr/Pa] | 593 | 323 | 514 | 817 | 618 | 855 | 1134 | 1499 | 1263 | 194 | 1110 |

TABLE 2

| | Peak position (μm) | Porosity (%) | Skewness S | Kurtosis K |
|---|---|---|---|---|
| Example 1 | shoulder/35.6 | 79 | −1.24 | 5.3 |
| Example 2 | shoulder/33.6 | 76 | −0.84 | 3.7 |
| Example 3 | shoulder/33.6 | 79 | −1.03 | 4.6 |
| Example 4 | shoulder/35.6 | 85 | −1.33 | 6.3 |
| Example 5 | shoulder/31.7 | 81 | −1.06 | 5.0 |
| Example 6 | shoulder/39.9 | 81 | −1.58 | 7.1 |
| Example 7 | 31.7 | 84 | −1.73 | 8.0 |
| Example 8 | 33.6 | 83 | −1.85 | 9.0 |
| Example 9 | 33.7 | 84 | −1.92 | 9.5 |
| Comp. Example 1 | 15.0/35.6 | 81 | −0.49 | 4.1 |
| Comp. Example 2 | 37.7 | 85 | −2.58 | 11.5 |

TABLE 3

| | Voltage (Va) at 80° C., RH 100%, 1.0 A/cm$^2$ | Voltage (Vm) at 80° C., RH 65%, 1.0 A/cm$^2$ | Voltage (Vb) at 80° C., RH 42%, 1.0 A/cm$^2$ | Vb/Va | Va/Vm | Vb/Vm |
|---|---|---|---|---|---|---|
| Example 1 | 0.540 | 0.546 | 0.426 | 0.79 | 0.99 | 0.78 |
| Example 2 | 0.579 | 0.564 | 0.422 | 0.73 | 1.03 | 0.75 |
| Example 3 | 0.537 | 0.550 | 0.454 | 0.85 | 0.98 | 0.83 |
| Example 4 | 0.597 | 0.624 | 0.623 | 1.04 | 0.96 | 1.00 |
| Example 5 | 0.573 | 0.571 | 0.579 | 1.01 | 1.00 | 1.01 |
| Example 6 | 0.573 | 0.575 | 0.572 | 1.00 | 1.00 | 0.99 |
| Example 7 | 0.520 | 0.513 | 0.417 | 0.80 | 1.01 | 0.81 |
| Example 8 | 0.531 | 0.502 | 0.405 | 0.76 | 1.06 | 0.81 |
| Example 9 | 0.539 | 0.530 | 0.462 | 0.86 | 1.02 | 0.87 |

TABLE 3-continued

|  | Voltage (Va) at 80° C., RH 100%, 1.0 A/cm² | Voltage (Vm) at 80° C., RH 65%, 1.0 A/cm² | Voltage (Vb) at 80° C., RH 42%, 1.0 A/cm² | Vb/Va | Va/Vm | Vb/Vm |
|---|---|---|---|---|---|---|
| Comp. Example 1 | 0.466 | 0.596 | 0.560 | 1.20 | 0.78 | 0.94 |
| Comp. Example 2 | 0.596 | 0.601 | 0.402 | 0.67 | 0.99 | 0.67 |

INDUSTRIAL APPLICABILITY

According to the present invention, a porous electrode substrate is provided, which is adaptable to a wide variety of power generating conditions from wet and low-temperature conditions to dry and high-temperature conditions. Also provided are a membrane-electrode assembly and a polymer electrolyte fuel cell comprising such a porous electrode substrate.

What is claimed is:

1. A porous electrode substrate, comprising:
   carbon fibers with a fiber diameter of 3~15 μm and a fiber length of 2~30 mm dispersed and bound with a carbonized resin,
   wherein, when a pore distribution in the porous electrode substrate is determined with a mercury intrusion porosimeter, and a pore distribution curve is plotted on a graph having a common logarithmic scale on the horizontal axis, such that a 1~100 μm pore diameter range of the pore distribution curve includes at least 80 plotting points with a constant interval on the common logarithmic scale, the pore distribution has a skewness (S) of $-2.0<S<-0.8$ and a kurtosis (K) of $3.5<K<10$ in the 1~100 μm pore diameter range.

2. The porous electrode substrate according to claim 1, wherein the distribution has a skewness (S) of $-2.0<S<-0.8$ and a kurtosis (K) of $3.5<K<10$ in the 1~100 μm pore diameter range, while having one peak in the 20~100 μm pore diameter range.

3. The porous electrode substrate according to claim 1, wherein the distribution has a skewness (S) of $-2.0<S<-0.8$ and a kurtosis (K) of $3.5<K<10$ in the 1~100 μm pore diameter range, while having no peak in the 1~20 μm pore diameter range.

4. The porous electrode substrate according to claim 1, wherein the distribution has a skewness (S) of $-2.0<S<-0.8$ and a kurtosis (K) of $3.5<K<10$ in the 1~100 μm pore diameter range, while having one peak in the 20~100 μm pore diameter range but no peak in the 1~20 μm pore diameter range.

5. The porous electrode substrate according to claim 1, wherein the conditions are set to have only one peak in the 20~100 μm pore diameter range.

6. The porous electrode substrate according to claim 1, wherein, when measured using the porous electrode substrate treated only for water repellency:
   voltage value (Vm) at cell temperature of 80° C., relative humidity of 65% and current density of 1.0 A/cm² is at least 0.5 V; and
   the ratio of voltage value (Vb) at cell temperature of 80° C., relative humidity of 42% and current density of 1.0 A/cm² to voltage value (Va) at cell temperature of 80° C., relative humidity of 100% and current density of 1.0 A/cm² is Vb/Va=0.7~1.1.

7. The porous electrode substrate according to claim 1, wherein, when measured using the porous electrode substrate treated only for water repellency:
   voltage value (Vm) at cell temperature of 80° C., relative humidity of 65% and current density of 1.0 A/cm² is at least 0.5 V; and
   the ratio of voltage value (Va) at cell temperature of 80° C., relative humidity of 100% and current density of 1.0 A/cm² to the voltage value (Vm) is Va/Vm=0.8~1.2; and
   the ratio of voltage value (Vb) at cell temperature of 80° C., relative humidity of 42% and current density of 1.0 A/cm² to the voltage value (Vm) is Vb/Vm=0.7~1.1.

8. A porous electrode substrate, comprising a coating layer made of carbon powder and a water repellent formed on either surface and/or both surfaces of the porous electrode substrate according to claim 1.

9. A membrane-electrode assembly, comprising the porous electrode substrate according to claim 1.

10. A polymer electrolyte fuel cell, comprising the membrane-electrode assembly according to claim 9.

11. A method for producing the porous electrode substrate of claim 1, the method comprising:
    dispersing the carbon fibers in water to produce a carbonfiber sheet material;
    impregnating a thermosetting resin into the carbon-fiber sheet material to form a resin-impregnated sheet;
    hot pressing the resin-impregnated sheet at a temperature range of 100 to 400° C to obtain a resin-cured sheet; and
    carbonizing the resin-cured sheet at a temperature of 1000° C or higher to obtain a porous electrode substrate,
    wherein the hot pressing is conducted with a hot-pressing apparatus such that a clearance between surfaces of pressing plates of the apparatus is set to be 15~45% of a thickness of the resin-impregnated sheet.

12. The porous electrode substrate according to claim 1, wherein the distribution has a skewness (S) of $-1.92<S<-0.84$ and a kurtosis (K) of $3.7<K<9.5$ in the 1~100 μm pore diameter range.

13. The porous electrode substrate according to claim 12, wherein, when measured using the porous electrode substrate treated only for water repellency:
    voltage value (Vm) at cell temperature of 80° C., relative humidity of 65% and current density of 1.0 A/cm² is at least 0.5 V; and
    the ratio of voltage value (Vb) at cell temperature of 80° C., relative humidity of 42% and current density of 1.0 A/cm² to voltage value (Va) at cell temperature of 80° C., relative humidity of 100% and current density of 1.0 A/cm² is Vb/Va=0.73~1.01.

14. The porous electrode substrate according to claim 13, having a porosity of from 76-85%.

15. The porous electrode substrate according to claim 13, having a porosity of 79% or less.

16. The porous electrode substrate according to claim 1, which is obtained by a process comprising:
impregnating a thermosetting resin into a carbon-fiber sheet material comprising the carbon fibers to form a resin-impregnated sheet; and
hot pressing the resin-impregnated sheet at a temperature range of 100 to 400° C. and a pressure of 1-20 MPa.

17. The porous electrode substrate according to claim 1, which is obtained by a process comprising:
impregnating a thermosetting resin into a carbon-fiber sheet material comprising the carbon fibers to form a resin-impregnated sheet; and
hot pressing the resin-impregnated sheet at a temperature range of 100 to 400° C. with a hot-pressing apparatus such that a clearance between surfaces of pressing plates of the apparatus is 15-45% of a thickness of the resin-impregnated sheet.

18. The porous electrode substrate according to claim 1, which is obtained by a process comprising:
dispersing the carbon fibers in water to produce a carbon-fiber sheet material;
impregnating a thermosetting resin into the carbon-fiber sheet material to form a resin-impregnated sheet;
hot pressing the resin-impregnated sheet at a temperature range of 100 to 400° C. to obtain a resin-cured sheet; and
carbonizing the resin-cured sheet at a temperature of 1000° C. or higher such that the thermosetting resin is carbonized and binds the carbon fibers as the carbonized resin,
wherein the hot pressing is conducted with a hot-pressing apparatus such that a clearance between surfaces of pressing plates of the apparatus is 15-45% of a thickness of the resin-impregnated sheet.

19. The porous electrode substrate according to claim 16, wherein an amount of the thermosetting resin impregnated into the carbon-fiber sheet material is 90 parts by mass or more with respect to 100 parts by mass of the carbon fibers.

20. The porous electrode substrate according to claim 17, wherein an amount of the thermosetting resin impregnated into the carbon-fiber sheet material is 90 parts by mass or more with respect to 100 parts by mass of the carbon fibers.

* * * * *